United States Patent [19]

Walton

[11] Patent Number: 5,021,778
[45] Date of Patent: Jun. 4, 1991

[54] CAPACITANCE COUPLED PROXIMITY IDENTIFICATION SYSTEM

[76] Inventor: Charles A. Walton, 19115 Overlook Rd., Los Gatos, Calif. 95030

[21] Appl. No.: 405,531

[22] Filed: Sep. 11, 1989

[51] Int. Cl.⁵ .............................................. H04B 5/00
[52] U.S. Cl. ............................... 340/825.54; 340/933
[58] Field of Search .............. 364/424.02, 436, 467; 340/562, 932.2, 933, 935, 825.3, 825.33, 825.34, 825.54; 361/181, 280, 281, 283; 235/380, 451; 902/25

[56] References Cited

U.S. PATENT DOCUMENTS

| | | | |
|---|---|---|---|
| 3,778,761 | 12/1973 | Cribbins | 340/933 |
| 4,208,695 | 6/1980 | Noda et al. | 361/181 |
| 4,520,885 | 6/1985 | Jeffrey | 340/935 |
| 4,665,395 | 5/1987 | Van Ness | 340/932.2 |
| 4,876,535 | 10/1989 | Ballmer et al. | 235/380 |
| 4,888,474 | 12/1989 | Walton | 235/380 |

FOREIGN PATENT DOCUMENTS

| | | | |
|---|---|---|---|
| 2125598 | 3/1984 | United Kingdom | 340/933 |
| 2154832 | 9/1985 | United Kingdom | 340/933 |

Primary Examiner—Donald J. Yusko
Assistant Examiner—Dervis Magistre
Attorney, Agent, or Firm—Thomas E. Schatzel

[57] ABSTRACT

A reader section has a reader circuit connected to three parallel metal plates. The center plate is excited by an alternating voltage and the other two plates are excited by an inverse voltage. An identifier section has an identifier circuit connected to a metal plate identifier antenna. The electric field created by the metal plates of the reader antenna is detected by the identifier section and an identifier signal is generated in response thereto.

10 Claims, 3 Drawing Sheets

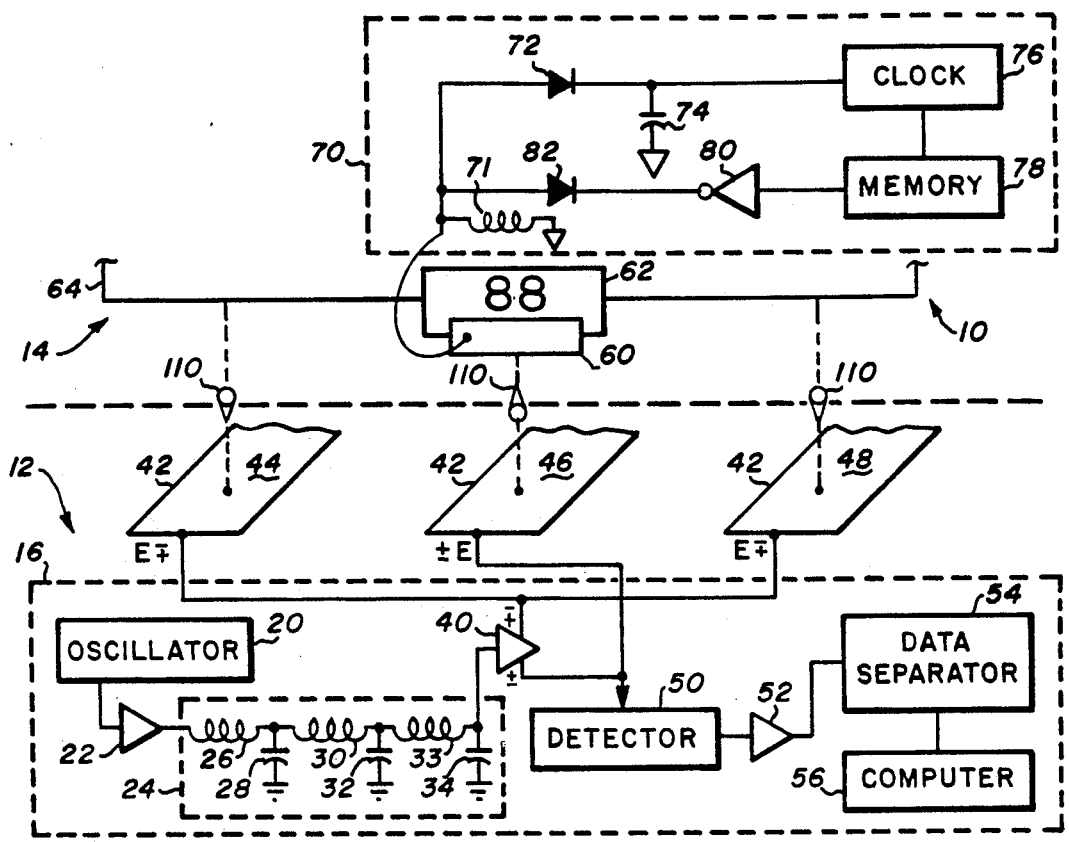
Fig_1
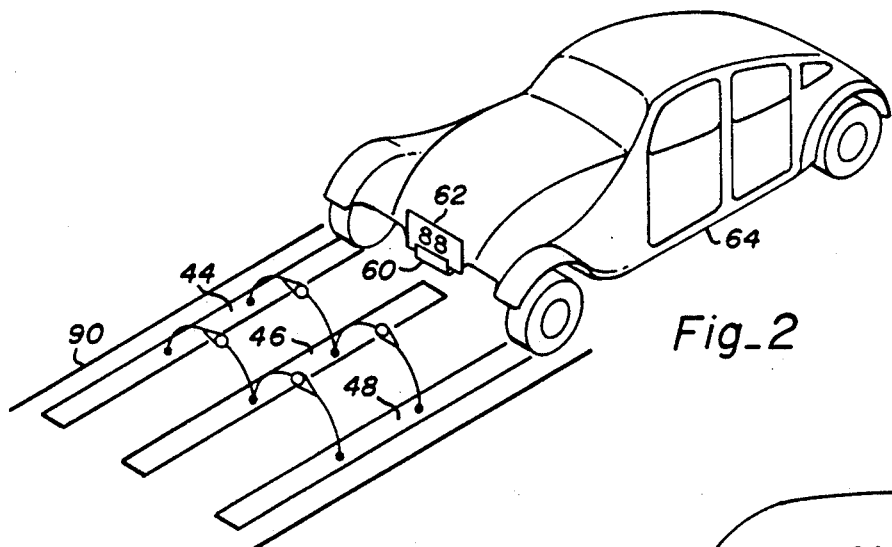
Fig_2
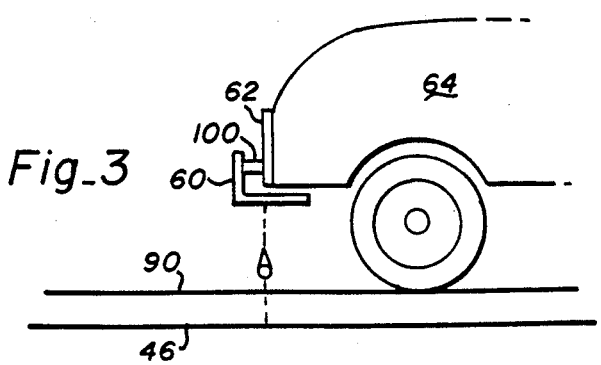
Fig_3

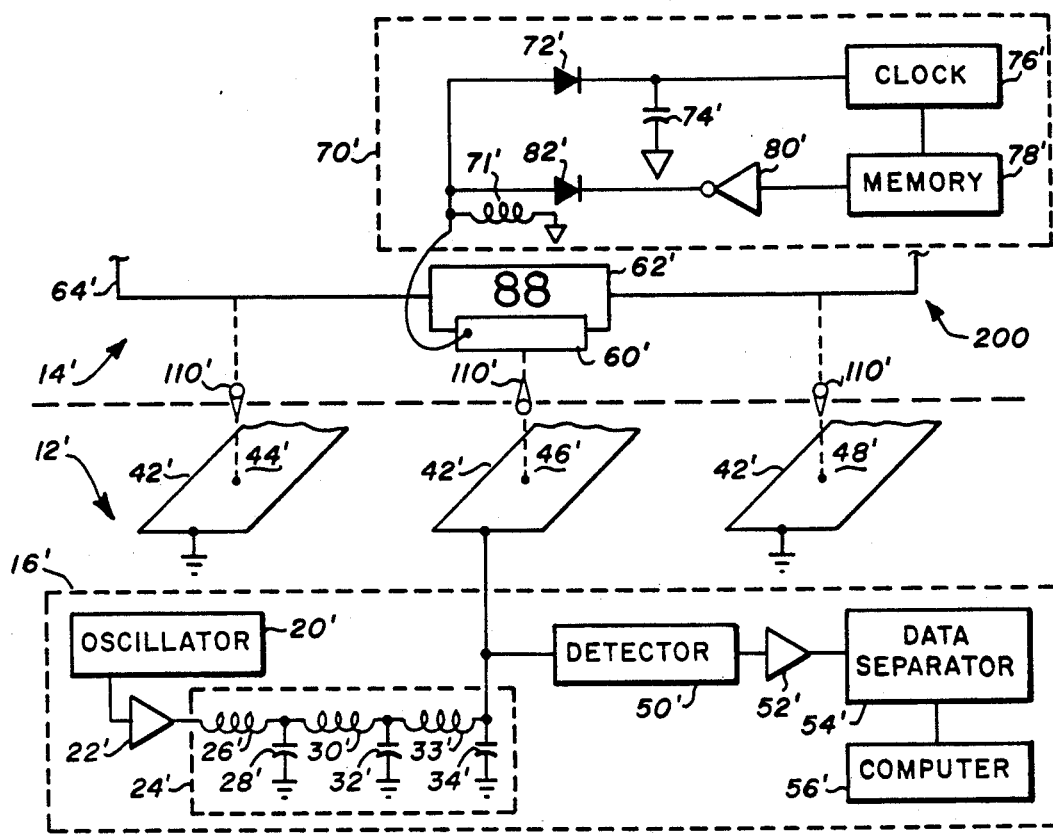
Fig_4
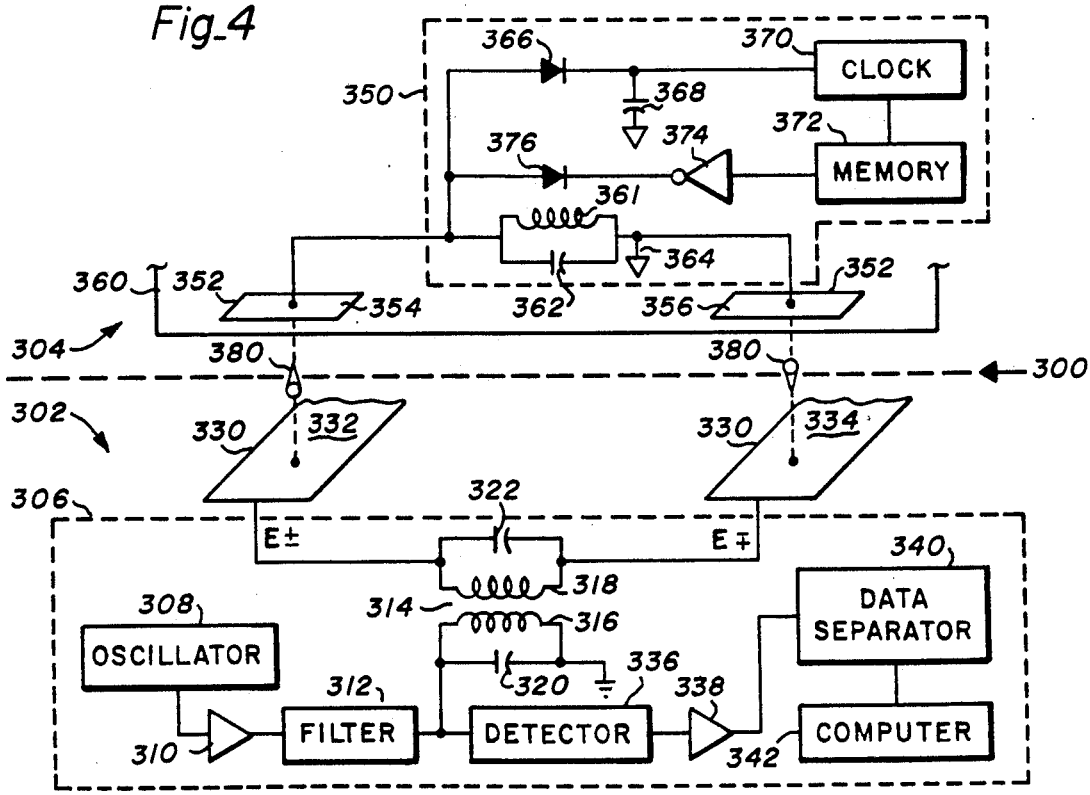
Fig_5

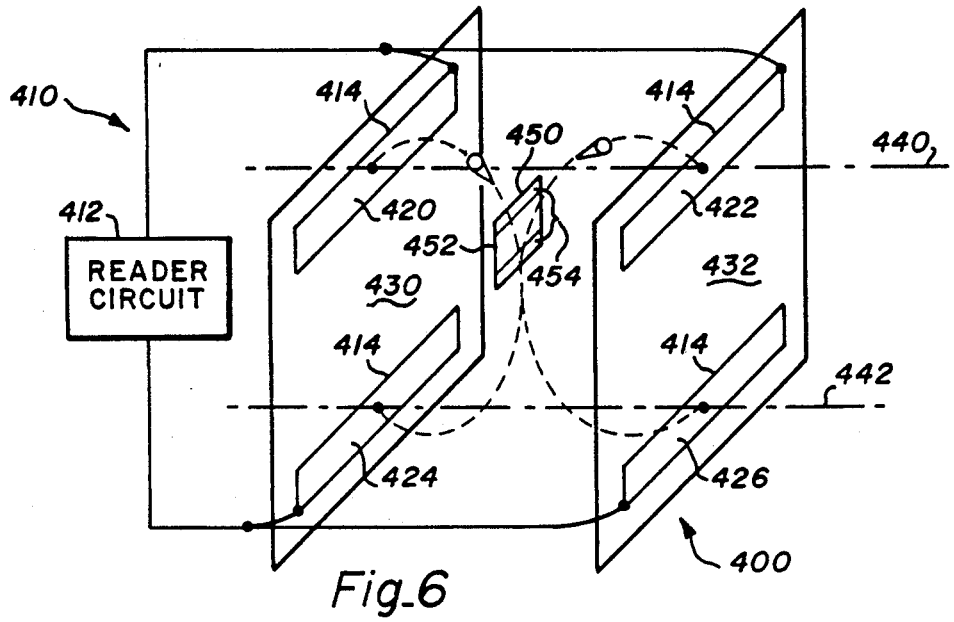
Fig_6
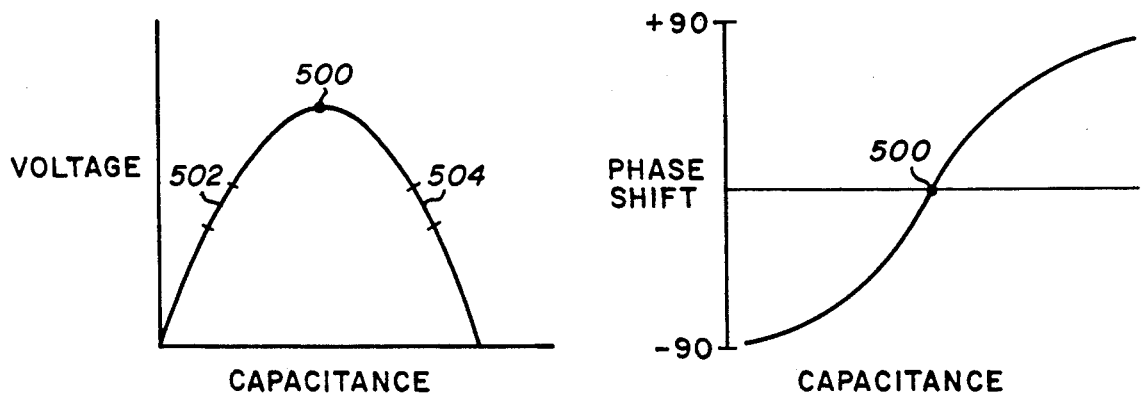
Fig_7
Fig_8
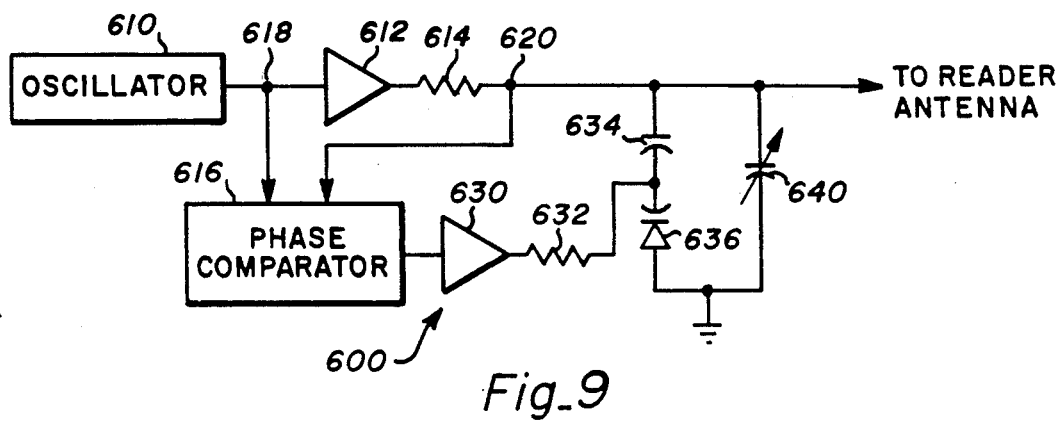
Fig_9

CAPACITANCE COUPLED PROXIMITY IDENTIFICATION SYSTEM

BACKGROUND OF THE INVENTION

1. Field of the Invention

This invention relates generally to electronic identification and recognition systems and more specifically to such systems wherein it is not necessary to make physical contact between the identifier section and the reader section.

2. Description of the Prior Art

There are various electronic identification and recognition systems known in the art wherein the identifying device is portable. The identifying device is hereinafter referred to as an identifier section and may take the form of a card, tag or key. The recognition station, hereinafter known as the reader section, is prepared to recognize certain predetermined characteristics of the identifier section when the identifier section is brought within the proximity of the reader section.

Uses for such systems may include identification of persons having identifier sections in their possession. For example, the identifier section may take the shape of a credit card and have an electronic circuit embedded therein for radiating signals of identifying intelligence. An individual possessing the card may position it adjacent a door that the individual desires to enter. A reader section is arranged to control the door latch and if it recognizes radiated signals of a certain predetermined intelligence, the reader section opens the door. Other uses for such systems include having the identifier section in the form of a tag attached to a vehicle to be identified. As the vehicle passes a certain location, such as a toll booth, its identification is recognized and recorded. Also, in production lines, garments or other items may carry identification sections as tags so that they can be appropriately processed as they are recognized along various points in the production process.

The prior art includes various patents and patent applications by the present inventor. The patents include U.S. Pat. No. 3,732,465 for "Electronic Sensing and Actuator System", issued May 8, 1973; U.S. Pat. No. 4,223,830 for "Identification System", issued Sept. 23, 1980; U.S. Pat. No. 4,236,068 for "Personal Identification and Signaling System", issued Nov. 25, 1980; U.S. Pat. No. 4,384,288 for "Portable Radio Frequency Emitting Identifier", issued May 17, 1983; U.S. Pat. No. 4,388,524 for "Electronic Identification and Recognition With Code Changeable Reactance", issued June 14, 1983; U.S. Pat. No. 4,459,474 for "Identification System With Separation and Direction Capability and Improved Noise Reduction", issued July 10, 1984; U.S. Pat. No. 4,473,825 for "Electronic Identification System With Power Input-Output Interlock and Increased Capabilities", issued Sept. 25, 1984; U.S. Pat. No. 4,546,241 for "Electronic Proximity Identification System", issued Oct. 8, 1985; U.S. Pat. No. 4,580,041 for "Electronic Proximity Identification System With Low Power Identifier, Simplified", issued Apr. 1, 1986; U.S. Pat. No. 4,600,829 for "Electronic Proximity Identification and Recognition System With Isolated Two-Way Coupling", issued July 15, 1986; U.S. Pat. No. 4,654,658 for "Identification System With Vector Phase Angle Detection", issued Mar. 31, 1987; U.S. Pat. No. 4,656,472 for "Proximity Identification System With Power Aided Identifier", issued Apr. 7, 1987; and U.S. Pat. No. 4,782,342 for "Proximity Identification System With Lateral Flux Paths", issued Nov. 1, 1988. In addition, there is currently pending U.S. patent application Ser. No. 07/203,944, now U.S. Pat. No. 4,888,474, for "Proximity Identification System With Lateral Flux Magnetic Rod Coupling", filed June 8, 1988.

SUMMARY OF THE PRESENT INVENTION

It is an object of the present invention to provide an inexpensive proximity identification system with high speed data transmission.

It is another object of the present invention to provide a proximity identification system having capacitance coupling.

Briefly, in a preferred embodiment, the present invention comprises a reader section having a reader circuit connected to the three parallel metal plates. The center metal plate is excited by the reader circuit with an alternating voltage and the other two metal plates are excited with a voltage inverse to that of the center plate. An alternating electric field is thereby created.

An identifier section has an identifier circuit connected to a pair of identifier metal plates. The presence of the electric field induces a voltage in the identifier circuits. The identifier circuits generate an identifier signal. The identifier signal is then detected by the reader circuit.

It is an advantage of the present invention in that it provides a proximity identification system which is both inexpensive and has high speed data transmission.

It is another advantage of the present invention in that it provides a proximity identification system having capacitance coupling.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a circuit diagram of the proximity identification system of the present invention as used in a vehicle identification application;

FIG. 2 is a perspective view of the system of FIG. 1;

FIG. 3 is a side view of the system of FIG. 1;

FIG. 4 is a circuit diagram of an alternative embodiment of the present invention;

FIG. 5 is a circuit diagram of another alternative embodiment of the present invention;

FIG. 6 is a diagram of an alternative embodiment of the present invention for use in individual identification applications;

FIG. 7 is a graph of voltage versus capacitance;

FIG. 8 is a graph of phase angle versus capacitance; and

FIG. 9 is a circuit diagram of an automatic tuning circuit of the present invention.

DETAILED DESCRIPTION OF THE PREFERRED EMBODIMENTS

FIG. 1 shows a proximity identification system of the present invention and is designated by the general reference number 10. System 10 comprises a reader section 12 and an identifier section 14. Reader section 12 comprises a reader circuit 16. Reader circuit 16 has an oscillator 20. Oscillator 20 is generally set at frequencies within the IMS (industrial, medical and scientific)

bands, or in a band where FCC approval can be obtained.

Oscillator 20 is connected to an amplifier 22. Amplifier 22 is connected to a filter 24. Filter 24 is comprised of an inductor 26 connected to amplifier 22. A capacitor 28 is connected between inductor 26 and ground. An inductor 30 is connected to inductor 26. A capacitor 32 is connected between inductor 30 and ground. An inductor 33 is connected to inductor 30. A capacitor 34 is connected between inductor 32 and ground.

An amplifier 40 is connected to filter 24. Amplifier 40 has two outputs which are 180° out of phase with one another. A reader antenna 42 is comprised of three metal plates 44, 46 and 48. Plates 44 and 48 are connected to one output of operational amp 40 and center plate 46 is connected to the other output.

A detector 50 is connected to plate 46. An amplifier 52 is connected to detector 50. A data separator 54 is connected to amplifier 52. Data separator 54 is connected to a computer 56. Various types of detectors and data separators are described in the referenced patents by the same inventor.

An identifier antenna 60 is comprised of a metallic plate. Antenna 60 is attached to a license plate 62 of a vehicle 64. Identifier antenna 60 bends around the bottom of license plate 62 such that a large portion of its plate surface is parallel to plates 44, 46 and 48 of reader antenna 42.

An identifier circuit 70 is connected to identifier antenna 60. Circuit 70 comprises an inductance 71 connected to a floating ground. Circuit 70 also comprises a diode 72 connected to antenna 60. A capacitor 74 is connected between diode 72 and a floating ground. A clock 76 is connected to diode 72. A memory 78 is connected to clock 76. An inverter 80 is connected to memory 78. A diode 82 is connected between inverter 78 and antenna 60.

FIG. 2 shows a perspective view of a portion of system 10. Plates 44, 46 and 48 are elongated strips which are positioned within and parallel to the surface of road bed 90. The plates 44, 46 and 48 are positioned such that their longitudinal sides are parallel to the direction of travel of vehicle 64.

FIG. 3 is a side view of a portion of system 10. Identifier antenna 60 is connected to license plate 62 by an insulating block of material 100. Block 100 contains reader circuit 70.

In operation, oscillator 20 sends a power signal through amplifier 22 and filter 24 to antenna 42. Plate 46 is excited in opposite phase to plates 44 and 48. An electric field is created around antenna 42. This field is represented by flux lines 110. When identifier 14 enters the field, antenna plate 60 is energized. The antenna plate 60 and inductance 71 resonate and generate a voltage. This voltage is rectified by diode 72, smoothed by capacitor 74 and provides power to clock 76. Clock 76 cycles the memory 78. Memory 78 emits digital data representing a unique code of the vehicle. This data signal passes through inverter 80 and diode 82 and intermittently pulls the voltage of antenna 60 to zero. This in turn modulates the electric field and transmits the identifier signal to plate 46. The identifier signal is detected by detector 50 and amplified by amplifier 52. Data separator 54 converts the identifier signal back into a digital signal for use by computer 56.

FIG. 4 is a circuit diagram of an alternative embodiment of the present invention and is designated by the general reference number 200. Elements of system 200 which are similar to those of system 10 are designated by a prime number designation. System 200 differs from system 10 in that plate 44' and 48' do not receive a power signal from reader circuit 16', but are instead grounded and act as the ground return for the power signal. The operation of system 200 is otherwise the same as system 10.

FIG. 5 is a circuit diagram of an alternative embodiment of the present invention and is designated by the general reference number 300. System 300 comprises a reader section 302 and an identifier section 304. Reader section 302 comprises a reader circuit 306. Reader circuit 306 comprises an oscillator 308. Oscillator 308 is connected to an amplifier 310. Amplifier 310 is connected to a filter 312. Filter 312 is similar to that of filter 24 of FIG. 1.

A transformer 314 has a primary winding 316 and a secondary winding 318. The transformer 314 is toroidal wound. Filter 312 is connected to primary winding 316. A capacitor 320 tunes winding 316. A capacitor 322 tunes winding 318. A reader antenna 330 is comprised of a pair of metallic plates 332 and 334. Plate 332 is connected to one side of secondary winding 318 and plate 334 is connected to the other side. Plate 332 and 334 are mounted within a road bed.

A detector 336 is connected to primary winding 316. An amplifier 338 is connected to detector 336. A data separator 340 is connected to amplifier 338 and a computer 342 is connected to data separator 340. Detector 336 and data separator 340 are similar to that described for system 10.

Identifier section 304 comprises an identifier circuit 350 and a reader antenna 352. Reader antenna 352 is comprised of two metallic plates 354 and 356 mounted beneath a vehicle 360.

Identifier circuit 350 comprises an inductor 361 and a capacitor 362 connected in parallel. Inductor 361 and capacitor 362 are connected between plate 354 and plate 356. A floating ground 364 is connected between plate 356 and inductor 360. A diode 366 is connected to plate 354. A capacitor 368 is connected between diode 366 and a floating ground. A clock 370 is connected to diode 366. A memory 372 is connected to clock 370. An inverter 374 is connected to memory 372. A diode 376 is connected between inverter 374 and plate 354.

In operation, oscillator 308 delivers electrical power through amplifier 310, filter 312 and transformer 314. Plates 332 and 334 receive an alternating voltage which is 180° out of phase with each other. An electric field is created as indicated by flux lines 380. When vehicle 360 approaches the reader section 302, plates 354 and 356 are positioned over plates 332 and 334, respectively. A voltage potential is created between plates 354 and 356. This voltage is rectified and smoothed by diode 366 and capacitor 368 and this in turn powers clock 370. Clock 370 then cycles memory 372 and a digital signal is emitted representing a unique code of the vehicle 360. The data signal passes through inverter 374 and diode 376 and intermittently pulls the voltage of plate 354 to zero. This in turn modulates the electric field and transmits the identifier signal to plates 332 and 334. The identifier signal is detected by detector 336, amplified by amplifier 338 and data separator 340 converts the identifier signal back into digital data for use by computer 342.

FIG. 6 is a diagram of a proximity identification system of the present invention for use in identifying individuals and is designated by the general reference number 400. System 400 has a reader section 410 comprised of a reader circuit 412 connected to a reader antenna 414. Reader circuit 412 is similar to reader circuit 306 of system 300.

Reader antenna 414 comprises four metallic strip plates 420, 422, 424 and 426. Plates 420 and 422 are connected to reader circuit 412 in the same way that plate 332 is connected to circuit 306. Plates 424 and 426 are connected to reader circuit 412 in the same way that plate 334 is connected to circuit 306. Plates 420, 422, 424 and 426 are parallel. Plates 420 and 424 lie in plane 430 and plates 422 and 426 lie in plane 432. Planes 430 and 432 are parallel to one another and on opposite sides of a passageway or door entry. A line 440 passes through the mid-point of plates 420 and 422 and is perpendicular to planes 430 and 432. A line 442 passes through the mid-point of plates 424 and 426 and is perpendicular to planes 430 and 432.

An identifier section 450 is shaped like a badge to be worn by individuals. The section 450 comprises a reader circuit 452 connected to a pair of identifier antenna plates 454. The reader circuit 452 and antenna 454 are similar to circuit 350 and antenna 352 of system 300.

In operation, system 400 functions similar to system 300. An individual wearing the identifier section 450 enters a passageway between planes 430 and 432. The reader circuit 412 then identifies the particular individual.

FIG. 7 shows a graph of voltage versus tuning capacitance for the reader antenna 42 of system 10. FIG. 7 also applies to antennas 330, 352 and 414. A point 500 shows where peak resonance occurs. The system 10 can operate without peak resonance, but peak resonance allows operation at low power. A problem arises when other objects in the field introduce what is referred to as "stray" or unwanted capacitance. The system loses its resonance tuning, with consequential loss of performance. The "other objects" may be the large metal mass of a vehicle or the body of a human being.

These other objects change the capacitance of the system 10 and result in the system operating on either side of peak resonance 500. For example, system 10 may be in either a band 502 or a band 504.

FIG. 8 shows a graph of phase shift versus capacitance for reader antenna 42 of system 10. Note that at the point 500 of peak resonance, the system 10 has zero phase shift. An increase or decrease in capacitance due to interfering bodies will result in either a positive or negative phase shift.

FIG. 9 shows a circuit diagram of an automatic tuning circuit which is designated by the general reference number 600. Circuit 600 is comprised of an oscillator 610 which is connected to an amplifier 612. A resistor 614 is connected between amplifier 612 and a reader antenna. A phase comparator 616 is connected to a point 618 between oscillator 610 and amplifier 612. Phase comparator 616 may be a DIPS LM 1391, CMOS 565/8 or may be fabricated from standard logic blocks. Phase comparator 616 is also connected to a point 620 between resistor 614 and the reader antenna. The output of phase comparator 616 is connected to an amplifier 630 and a resistor 632. A capacitor 634 is connected between point 620 and resistor 632. A varactor 636 is connected between resistor 632 and ground. A tuning capacitor 640 is connected between point 620 and ground.

Circuit 600 may be substituted for oscillator 20 and amplifier 22 of system 10; for oscillator 20' and amplifier 22' in system 200; or for oscillator 308 and amplifier 310 of system 300.

In operation, phase comparator 616 receives input from the oscillator 610 and the reader antenna and compares the phase. If the capacitance has recently changed due to the proximity of another object, then the system will not be at peak resonance and a phase shift will result. Phase comparator 616 outputs a positive or negative signal according to the phase difference. This signal is amplified by amplifier 630 and is used to control voltage on varactor 636. Varactor 636 varies its capacitance value to re-tune the system and to compensate for capacitance changes from the other objects. Resistors 620 and 632 resist back-flow of radio frequency voltage into amplifiers 612 and 630, respectively.

The advantages of the present invention may now be understood. The present invention teaches the use of capacitance coupling in a proximity identification system. It does not require the ferrite rods or loop antennas as in the prior art inductive coupling systems. The present invention is also able to transmit data at a higher speed than the prior art inductive systems. The present invention is also less complex in design than the prior art radio transmission and reception systems.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appending claims be interpreted as covering all alterations and modifications as fall within the true spirit and scope of the invention.

What is claimed is:

1. A proximity identification system comprising:
   a reader section having a reader circuit means connected to a reader antenna, said reader circuit means including an oscillator means connected to said reader antenna for supplying electrical power to said reader antenna to create an electric filed and for detecting an identifier signal, said reader antenna comprising three parallel metal plates with a first of said plates being supplied with electrical power from said reader circuit means, and a second and third of said plates positioned on either side of said first plate and being connected to ground; and
   an identifier section having an identifier circuit means connected to an identifier antenna comprising a metal plate for capacitive coupling to said reader antenna, said identifier circuit means for generating an identifier signal responsive to said electric field.

2. A proximity identification system comprising:
   a reader section having a reader circuit means connected to a reader antenna, said reader circuit means including an oscillator means connected to said reader antenna for supplying electrical power to said reader antenna to create an electric field and for detecting an identifier signal, said reader antenna comprising three parallel metal plates with a first of said plates being supplied with electrical power from said reader circuit means of an alternating voltage, and a second and third of said plates positioned on either side of said first plate and supplied with electrical power from said reader circuit of an inverse voltage to that supplied to said first plate; and
   an identifier section having an identifier circuit means connected to an identifier antenna comprising a metal plate for capacitive coupling to said reader antenna, said identifier circuit means for generating an identifier signal responsive to said electric field.

3. A proximity identification system comprising:

a reader section having a reader circuit means connected to a reader antenna, said reader circuit means including an oscillator means connected to said reader antenna for supplying electrical power to said reader antenna to create an electric field and for detecting an identifier signal, said reader antenna comprising two metal plates with a first of said plates being supplied with electrical power from said reader circuit of an alternating voltage, and a second of said plates supplied with electrical power from said reader circuit means of an inverse voltage to that supplied to said first plate; and an identifier section having an identifier circuit means connected to an identifier antenna comprised of a pair of metal plates for capacitive coupling to said reader antenna, said identifier circuit means for generating an identifier signal responsive to said electric field.

4. A proximity identification system comprising:

a reader section having a reader circuit means connected to a reader antenna, said reader circuit means including an oscillator means connected to said reader antenna for supplying electrical power to said reader antenna to create an electric field and for detecting an identifier signal, said reader antenna comprising four parallel metal plates with a first and second of said plates lying in a first plane and a third and fourth of said plates lying in a second plane parallel to said first plane, said first and third plates being supplied with electrical power from said reader circuit means of an alternating voltage, and said second and fourth plates being supplied with electrical power from said reader circuit means for an inverse voltage to that supplied to said first and third plates; and an identifier section having an identifier circuit means connected to an identifier antenna comprised of a pair of metal plates for capacitive coupling to said reader antenna, said identifier means for generating an identifier signal responsive to said electric field.

5. A proximity identification system comprising:

a reader section having a reader circuit means connected to a reader antenna, said reader circuit means for supplying electrical power to said reader antenna to create an electric field and for detecting an identifier signal, said reader antenna comprising three parallel metal plates with a first of said plates being supplied with electrical power form said reader circuit means and a second and third of said plates positioned on either side of said first plate and being connected to ground, said reader circuit means further including an automatic antenna tuning circuit for tuning said reader antenna to peak resonance; and an identifier section having an identifier circuit means connected ot an identifier antenna comprising a metal plate for capacitive coupling to said reader antenna, said identifier means for generating an identifier signal responsive to said electric field.

6. A proximity identification system comprising:

a reader section having an oscillator connected to a reader antenna for supplying electrical power to said reader antenna to create an electric field, and a detection means connected to said reader antenna for detecting an identifier signal, said reader antenna comprising three parallel metal plates with a first of said plates being supplied with electrical power from said oscillator and a second and third of said plates positioned on either side of said first plate and being connected to ground; and an identifier section having an identifier antenna comprising a metal plate for capacitive coupling to said reader antenna, a power conversion mean connected to said identifier antenna for detecting said electric field and deriving a power signal therefrom, a memory means connected to said power conversion means for transmitting a unique code in response to said power signal, and a modulation means connected between said memory means and said identifier antenna for modulating said electric field to create said identifier signal.

7. A proximity identification system comprising:

a reader section having an oscillator connected to a reader antenna for supplying electrical a power to said reader antenna to create an electric field, and a detection means connected to said reader antenna for detecting an identifier signal, said reader antenna comprising three parallel metal plates with a first of said plates being supplied with electrical power from said oscillator of an alternating voltage and a second and third of said plates being positioned on either side of said first plate and being supplied with electrical a power form said oscillator of an inverse voltage to that supplied to said first plate; and an identifier section having an identifier antenna comprising a metal plate for capacitive coupling to said reader antenna, a power conversion means connected to said identifier antenna for detecting said electric field and deriving a power signal therefrom, a memory means connected to said power converter and means for transmitting a unique code in response to said power signal, and a modulation means connected between said memory means and said identifier antenna for modulating said electric field to create said identifier signal.

8. A proximity identification system comprising:

a reader section having an oscillator connected to a reader antenna for supplying electrical power to said reader antenna to create an electric field, and a detection means connected to said reader antenna for detecting an identifier signal, said reader antenna comprising two metal plates with a first of said plates being supplied with electrical power form said oscillator of an alternating voltage and a second of said plates supplied with electrical power from said oscillator of an inverse voltage to that supplied to said first plate; and an identifier section having an identifier antenna comprised of a pair of metal plates for capacitive coupling to said reader antenna, a power conversion means connected to said identifier antenna, a power conversion means connected to said identifier antenna for detecting said electric field and deriving a power signal therefrom, a memory means connected to said power converter means for transmitting a unique code in response to said power signal, and a modulation means connected between said memory means and said identifier antenna for modulating said electric field to create said identifier signal.

9. A proximity identification system comprising:

a reader section having an oscillator connected to a reader antenna for supplying electrical power to said reader antenna to create an electric field, and a detection means connected to said reader antenna for detecting an identifier signal, said reader antenna comprising four parallel metal plates with a first and second of said plates lying in a first plane and a third and fourth of said plates lying in a second plane parallel with said first plane, said first and third plates being supplied with electrical power from said oscillator of an alternating voltage, and said second and fourth plates being supplied with electrical power from said oscillator of an inverse voltage to that supplied to said first and third plates; and an identifier section having an identifier antenna comprised of a pair of metal plates for capacitive coupling to said reader antenna, a power conversion means connected to said identifier antenna for detecting said electric field and deriving a power signal therefrom, a memory means connected to said power converter means for transmitting a unique code in response to said power signal, and a modulation means connected between said memory means and said identifier antenna for modulating said electric field to create said identifier signal.

10. A proximity identification system comprising:

a reader section having an oscillator connected to a reader antenna for supplying electrical power to said reader antenna to create an electric field, and a detection means connected to said reader antenna for detecting an identifier signal, said reader circuit including an automatic antenna tuning circuit for tuning said reader antenna to peak resonance; and an identifier section having an identifier antenna comprising a metal plate for capacitive coupling to said reader antenna, a power conversion means connected to said identifier antenna for detecting said electric field and deriving a power signal therefrom, a memory means connected to said power converter means for transmitting a unique code in response to said power signal, and a modulation means connected between said memory means and said identifier antenna for modulating said electric field to create said identifier signal.

* * * * *